(12) United States Patent
Bollapragada et al.

(10) Patent No.: US 8,544,036 B2
(45) Date of Patent: Sep. 24, 2013

(54) METHODS AND APPARATUS FOR SCHEDULING BROADCAST COMMERCIALS

(75) Inventors: Srinivas Bollapragada, Niskayuna, NY (US); Marc Anthony Garbiras, Clifton Park, NY (US)

(73) Assignee: NBCUniversal Media, LLC, New York, NY (US)

( * ) Notice: Subject to any disclaimer, the term of this patent is extended or adjusted under 35 U.S.C. 154(b) by 1463 days.

(21) Appl. No.: 10/389,303

(22) Filed: Mar. 14, 2003

(65) Prior Publication Data

US 2004/0181802 A1  Sep. 16, 2004

(51) Int. Cl.
*H04N 7/10* (2006.01)
*H04N 7/025* (2006.01)
*H04H 20/14* (2008.01)
*H04H 60/29* (2008.01)
*G06Q 30/00* (2012.01)

(52) U.S. Cl.
USPC ............... 725/32; 725/22; 725/34; 725/36; 705/14.4; 705/14.61

(58) Field of Classification Search
USPC ............... 725/36; 705/14.1–14.23
See application file for complete search history.

(56) References Cited

U.S. PATENT DOCUMENTS

| | | | |
|---|---|---|---|
| 5,099,319 A * | 3/1992 | Esch et al. ............ | 725/36 |
| 5,515,098 A | 5/1996 | Carles | |
| 5,600,364 A | 2/1997 | Hendricks et al. | |
| 5,661,516 A | 8/1997 | Carles | |
| 5,794,210 A | 8/1998 | Goldhaber et al. | |
| 6,006,265 A | 12/1999 | Rangan et al. | |
| 6,020,883 A | 2/2000 | Herz et al. | |
| 6,088,722 A | 7/2000 | Herz et al. | |
| 6,272,483 B1 * | 8/2001 | Joslin et al. ............ | 706/62 |
| 6,411,992 B1 * | 6/2002 | Srinivasan et al. ...... | 709/218 |
| 2001/0049820 A1 * | 12/2001 | Barton ..................... | 725/32 |
| 2002/0013943 A1 * | 1/2002 | Haberman et al. ...... | 725/39 |
| 2003/0139961 A1 * | 7/2003 | Arguello et al. ......... | 705/9 |
| 2003/0149975 A1 * | 8/2003 | Eldering et al. ......... | 725/34 |
| 2003/0177490 A1 * | 9/2003 | Hoshino et al. ......... | 725/34 |
| 2005/0021403 A1 * | 1/2005 | Ozer et al. .............. | 705/14 |

* cited by examiner

*Primary Examiner* — Chris Parry
*Assistant Examiner* — Omar S Parra
(74) *Attorney, Agent, or Firm* — Fletcher Yoder, P.C.

(57) ABSTRACT

A method for scheduling broadcast commercials includes receiving a plurality of scheduling criteria, and automatically scheduling a plurality of commercials based on the received criteria.

24 Claims, 5 Drawing Sheets

Position percentages by client

| | Number of units aired prior to current show | | | # Units on Show | Percentage units prior to rotation | | | Percentage units after rotation | | |
|---|---|---|---|---|---|---|---|---|---|---|
| | First | Middle | Last | | First | Middle | Last | First | Middle | Last |
| 1 | 4 | 0 | 4 | 3.5 | 43.48 | 21.739 | 34.78 | 34.78 | 34.43 | 34.78 |
| 2 | 7 | 5 | 8 | 2.5 | 34.15 | 36.59 | 29.27 | 29.27 | 34.15 | 31.71 |
| 3 | 9 | 7 | 10 | 3.5 | 33.90 | 32.20 | 33.90 | 32.20 | 33.90 | 33.90 |
| 4 | 7 | 8 | 8 | 2.5 | 27.45 | 37.25 | 35.29 | 31.37 | 37.25 | 31.37 |
| 5 | 25 | 26 | 28 | 4 | 31.32 | 34.94 | 33.73 | 31.33 | 34.94 | 33.73 |
| 6 | 5 | 3 | 3 | 3 | 35.71 | 42.86 | 21.43 | 35.71 | 35.71 | 28.57 |
| 7 | 0 | 0 | 0 | 1.5 | 33.33 | 33.33 | 33.33 | 33.33 | 33.33 | 33.33 |
| 8 | 2 | 1 | 1 | 1.5 | 36.36 | 36.36 | 27.27 | 36.36 | 36.36 | 27.27 |

Figure 1: Example Commercial Schedule before and after rotation

| Break | Break Length | Position in Break | Initial Schedule | | | | Schedule after Rotation | | |
|---|---|---|---|---|---|---|---|---|---|
| | | | Unit Number | Client | Product Code | Unit Length | Unit Number | Client | Product Code | Unit Length |
| 1 | 180 | 0 | 1 | 1 | EGG | 30 | 6 | 4 | COS | 30 |
| | | 1 | 2 | 2 | DRG | 30 | 2 | 2 | DRG | 30 |
| | | 1 | 3 | 2 | ONE | 15 | 22 | 7 | DPT | 15 |
| | | 1 | 4 | 3 | BAK | 30 | 7 | 4 | OPT | 15 |
| | | 1 | 5 | 3 | BAK | 30 | 4 | 3 | BAK | 30 |
| | | 1 | 6 | 4 | COS | 30 | 1 | 1 | EGG | 30 |
| | | 2 | 7 | 4 | OPT | 15 | 9 | 6 | AU | 30 |
| 2 | 180 | 0 | 8 | 5 | ERN | 30 | 8 | 5 | FRN | 30 |
| | | 1 | 9 | 6 | AU | 30 | 5 | 3 | BAK | 30 |
| | | 1 | 10 | 1 | VAC | 15 | 19 | 8 | COS | 15 |
| | | 1 | 11 | 6 | GAM | 30 | 11 | 6 | GAM | 30 |
| | | 1 | 12 | 1 | MTL | 30 | 12 | 1 | MTL | 30 |
| | | 1 | 13 | 2 | DYE | 30 | 13 | 2 | DYE | 30 |
| | | 2 | 14 | 7 | ODY | 15 | 14 | 7 | ODY | 15 |
| 3 | 150 | 0 | 15 | 3 | GLE | 30 | 27 | 7 | DPT | 15 |
| | | 1 | 16 | 5 | AU | 30 | 15 | 3 | GLE | 30 |
| | | 1 | 17 | 4 | HME | 15 | 17 | 4 | HME | 15 |
| | | 1 | 18 | 6 | SLT | 30 | 18 | 6 | SLT | 30 |
| | | 1 | 19 | 8 | COS | 15 | 10 | 1 | VAC | 15 |
| | | 1 | 20 | 8 | 005 | 15 | 20 | 8 | COS | 15 |
| | | 2 | 21 | 4 | CER | 15 | 3 | 2 | ONE | 15 |
| 4 | 150 | 0 | 22 | 7 | DPT | 15 | 23 | 3 | ASM | 15 |
| | | 1 | 23 | 3 | ASM | 15 | 16 | 5 | AU | 30 |
| | | 1 | 24 | 5 | BAK | 30 | 24 | 5 | BAK | 30 |
| | | 1 | 25 | 5 | TOB | 30 | 25 | 5 | TOB | 30 |
| | | 1 | 26 | 1 | INS | 30 | 26 | 1 | INS | 30 |
| | | 1 | 27 | 7 | DPT | 15 | 21 | 4 | CER | 15 |
| | | 2 | 28 | 8 | COS | 15 | 28 | 8 | COS | 15 |

Figure 2: Position percentages by client

| | Number of units aired prior to current show | | | # Units on Show | Percentage units prior to rotation | | | Percentage units after rotation | | |
|---|---|---|---|---|---|---|---|---|---|---|
| | First | Middle | Last | | First | Middle | Last | First | Middle | Last |
| 1 | 4 | 0 | 4 | 3.5 | 43.48 | 21.739 | 34.78 | 34.78 | 34.43 | 34.78 |
| 2 | 7 | 5 | 8 | 2.5 | 34.15 | 36.59 | 29.27 | 29.27 | 34.15 | 31.71 |
| 3 | 9 | 7 | 10 | 3.5 | 33.90 | 32.20 | 33.90 | 32.20 | 33.90 | 33.90 |
| 4 | 7 | 8 | 8 | 2.5 | 27.45 | 37.25 | 35.29 | 31.37 | 37.25 | 31.37 |
| 5 | 25 | 26 | 28 | 4 | 31.32 | 34.94 | 33.73 | 31.33 | 34.94 | 33.73 |
| 6 | 5 | 3 | 3 | 3 | 35.71 | 42.86 | 21.43 | 35.71 | 35.71 | 28.57 |
| 7 | 0 | 0 | 0 | 1.5 | 33.33 | 33.33 | 33.33 | 33.33 | 33.33 | 33.33 |
| 8 | 2 | 1 | 1 | 1.5 | 36.36 | 36.36 | 27.27 | 36.36 | 36.36 | 27.27 |

Figure 3: Level-2 Conflict Resolving Swap Example

| Break | Initial Placement | | | After first swap | | | After second swap | | |
|---|---|---|---|---|---|---|---|---|---|
| | Length | Commercial | Product | Length | Commercial | Product | Length | Commercial | Product |
| 1 | 30 | C1 | AU | 30 | C7 | COM | 30 | C9 | SSL |
| 1 | 30 | C2 | AU | 30 | C2 | AU | 30 | C2 | AU |
| 1 | 30 | C3 | BRC | 30 | C3 | BRC | 30 | C3 | BRC |
| 1 | 15 | C4 | COM | 15 | C4 | COM | 15 | C4 | COM |
| 1 | 15 | C5 | GEF | 15 | C5 | GEE | 15 | C5 | GEF |
| 2 | 15 | C6 | GEF | 15 | C6 | GEF | 15 | C6 | GEF |
| 2 | 30 | C7 | COM | 30 | C1 | AU | 30 | C1 | AU |
| 2 | 30 | C8 | BRC | 30 | C8 | BRC | 30 | C8 | BRC |
| 3 | 30 | C9 | SSL | 30 | C9 | SSL | 30 | C7 | COM |
| 3 | 15 | C10 | GEF | 15 | C10 | GEF | 15 | C10 | GEF |
| 03 | 15 | C11 | BRC | 15 | C11 | BRC | 15 | C11 | BRC |
| 3 | 30 | C12 | AU | 30 | C12 | AU | 30 | C12 | AU |

Figure 4: Comparison of product conflict resolution Runtimes over 181 shows

| Run Time | Heuristic | CPLEX |
|---|---|---|
| <= 1 second | 180 | 110 |
| 1 second to 10 seconds | 0 | 31 |
| 10 seconds to 2 minutes | 0 | 9 |
| 2 minutes to 10 minutes | 0 | 11 |
| 10 minutes to 1 hour | 0 | 8 |
| > 1 hour | 1 hour | 0 |
| Average run time | <0.1 seconds | >327.5 seconds |

Figure 5: Heuristic performance evaluation

| Problem | Initial Schedule | | Heuristic | | | Cplex after 4 hours | | Cplex after 4 hrs. with heuristic initial solution | |
|---|---|---|---|---|---|---|---|---|---|
| | # Product Conflicts | Position Percent Deviation Penalty | # Product Conflicts | Position Percent Deviation Penalty | Run Time | # Product Conflicts | Position Percent Deviation Penalty | # Product Conflicts | Position Percent Deviation Penalty |
| 1 | 14 | 31.68 | 4 | 5.15 | 20 | 12 | 12.50 | 4 | 5.15 |
| 2 | 17 | 51.88 | 2 | 10.63 | 20 | 17 | 37.78 | 2 | 10.63 |
| 3 | 38 | 70.52 | 1 | 3.40 | 6 | 5 | 10.80 | 0 | 6.65 |
| 4 | 39 | 102.97 | 0 | 2.98 | 4 | 9 | 12.87 | 0 | 2.98 |
| 5 | 47 | 159.91 | 2 | 3.20 | 16 | 4 | 15.37 | 2 | 3.20 |
| 6 | 43 | 210.18 | 1 | 6.35 | 17 | 6 | 12.22 | 1 | 6.35 |
| 7 | 30 | 242.42 | 3 | 5.95 | 13 | 5 | 10.65 | 3 | 5.95 |
| 8 | 44 | 280.77 | 4 | 4.10 | 17 | 9 | 9.50 | 4 | 4.10 |
| 9 | 59 | 324.87 | 12 | 4.85 | 15 | 20 | 12.35 | 12 | 4.85 |
| 10 | 60 | 387.63 | 21 | 6.15 | 12 | 35 | 9.17 | 21 | 6.15 |
| 11 | 41 | 391.10 | 21 | 9.13 | 13 | 25 | 6.58 | 20 | 9.13 |
| 12 | 81 | 411.90 | 32 | 6.43 | 14 | 39 | 9.55 | 32 | 6.43 |
| 13 | 66 | 481.07 | 25 | 4.88 | 10 | 33 | 8.83 | 25 | 4.88 |
| 14 | 62 | 525.73 | 20 | 5.05 | 2 | 26 | 10.88 | 20 | 5.05 |
| 15 | 21 | 505.55 | 4 | 1.30 | | 4 | 3.05 | 4 | 1.30 |
| Average | *44.13* | *278.54* | *10.13* | *5.30* | *12.20* | *16.60* | *12.14* | *10.00* | *5.52* |

METHODS AND APPARATUS FOR SCHEDULING BROADCAST COMMERCIALS

BACKGROUND OF THE INVENTION

This invention relates generally to commercials and, more specifically, to methods and apparatus for automatically scheduling broadcast commercials.

Television (TV) networks broadcast a wide variety of programming often directed to a specific market, for example, talk shows, sports, game shows, and other entertainment shows. Additionally, prime time entertainment shows typically have wide appeal. Networks selling advertising slots to clients sell commercial space by the show on which a commercial will air. A commercial break includes a plurality of advertising slots wherein commercials can be broadcasted (i.e., aired). The exact location in the show that a commercial airs is decided at a later stage, usually close to the airdate of the show. At least one television network uses several criteria to generate a detailed schedule of commercials for each specific show. For example, the criteria can include ensuring that no two commercials promoting competing products from different clients air in the same break. Additionally, since the audience ratings tend to be higher at the start and end of a commercial break than during the middle of the break advertisers generally prefer the first and last positions in a commercial segment, to those in the middle. Finally, TV networks normally promise their clients an equitable rotation of commercials between the positions within a commercial break.

To schedule the commercials and meet the above criteria, the network manually examines the criteria and then schedules the commercials to best meet the criteria. Manually scheduling the commercials, for a large quantity of clients can be a cumbersome and time intensive process. Further, manually scheduling the commercials may lead to errors in the schedule, such as, scheduling two commercials for the same product adjacent to each other during the same commercial break, or scheduling competing products adjacent each other during the same commercial break.

BRIEF DESCRIPTION OF THE INVENTION

In one aspect, a method for scheduling broadcast commercials is provided. The method includes receiving a plurality of scheduling criteria, and automatically scheduling a plurality of commercials based on the received criteria.

In another aspect, a computer is programmed to receive a plurality of scheduling criteria, and automatically schedule a plurality of commercials based on the received criteria.

In yet another aspect, a computer readable medium encoded with a program is provided. The program is configured to instruct a computer to receive a plurality of scheduling criteria, and automatically schedule a plurality of commercials based on the received criteria.

BRIEF DESCRIPTION OF THE DRAWINGS

FIG. 1 illustrates a plurality of commercials that air in different breaks of a show as scheduled at a time of sale of the commercials.

FIG. 2 illustrates a plurality of units aired and percentages achieved in three different positions for each of a plurality of clients advertising on a show.

FIG. 3 illustrates an example in which no level-1 swap exists that resolves a conflict between a first commercial C1 and a second commercial C2.

FIG. 4 illustrates a comparison of runtimes of a heuristic algorithm versus a non-heuristic solution obtained using a commercial math problem solver.

FIG. 5 illustrates a performance of an entire heuristic method (product conflict resolution followed by rotation for achieving client position goals) with that of solving a problem P1 using the math solver.

DETAILED DESCRIPTION OF THE INVENTION

Television networks sell advertising slots to clients by the shows on which the slots air. The exact location in the show that a commercial airs is decided at a later stage, usually close to the airdate of the show. Several criteria are to be met in coming up with a detailed schedule of commercials in a show. The schedule should be such that no two commercials promoting competing products from different clients air in the same break. The audience ratings tend to be higher at the start and end of a commercial break than during the middle of the break. Therefore, advertisers generally prefer the first and last positions in a commercial segment, to those in the middle. TV networks normally promise their clients an equitable rotation of commercials between the positions within a commercial break. The scheduling of commercials on shows has heretofore been done manually. This process is very cumbersome, time intensive and error prone. However, herein described are methods and apparatus employing a novel solution by formulating the problem as a goal program. The goal program is given to a commercial math solver such as CPLEX to solve and then the goal program is used to develop an algorithm. In one embodiment, the commercial scheduling problem is formulated as an integer program, and a plurality of heuristic algorithms is herein described for automatically scheduling the commercials to facilitate meeting all or most of the herein described requirements. The herein described heuristic procedures compare very favorably with solutions obtained using a CPLEX math program solver available from ILOG, Inc of Mountain View, Calif., such as CPLEX 6.6. In addition to reducing sales personnel costs by automating the scheduling of commercials, the herein described methods and apparatus have increased customer satisfaction by lessening or minimizing errors in meeting customer requirements.

As described above, the first and last positions in a commercial break usually get higher audience ratings than the positions in the middle of a break. Therefore, these positions are highly coveted by the advertisers. Most clients purchase several commercial slots to air on a broadcast network. The networks usually promise certain percentages of first and last position slots to each client when a contract is signed. The networks are also required to air the client advertisements such that commercials of competing products are well separated. The networks usually accomplish this by ensuring that each commercial break has at most one advertisement for each group of competing clients. Typically, it is the job of commercial administration personnel to ensure that the advertisements air in the proper sequence prior to the broadcast of each show.

The television broadcast time is divided into day parts. Some clients purchase hundreds of advertising slots in each day part in a broadcast season. The television broadcast year in the United States starts in the third week of September. The broadcast networks announce their programming schedules for the new broadcast year in the middle of May. Shortly after that, the sale of inventory (advertising slots) begins. The broadcast networks sell about 60 to 80 percent of their airtime inventory during a brief period lasting about two to three weeks starting in late May. This sales period is known as the up-front market. The networks sell the rest of the inventory during the remainder of the year in what is called the scatter market.

The terms of a sales contract typically include the total cost of the package to the advertiser, the total Nielsen ratings points for the entire advertising campaign in the desired demographic that are promised to the client and a detailed list of commercials units that will be aired by show and by airdate for the duration of the contract which runs from a few months to an entire broadcast year. The exact locations on the shows where the commercials air are not typically specified in the contract. However, clients are typically promised that certain percentages of their commercials will be aired in the most coveted first positions and the second most desired last positions in the commercial breaks. These positions tend to get a higher audience rating than those in the middle. The sale is based on the average rating for the show. The advertisers are typically also promised at the time of the contract that their commercials will not be aired close to the airing of a commercial that promotes a competitor's product. These are called the product conflict requirements and they require that no two commercials that promote competing products air in the same break if possible. For example, two commercials promoting competing soda brands should not air in the same commercial break. At the time of sale, the commercial units purchased by an advertiser occupy the first available slots on the respective shows. No attempt is made at the time of sale to ensure that the product conflict or percentages by positions requirements are met. The actual sequence of airing the commercials on each show is decided at a later stage.

About a week to ten days before a show airs, commercial scheduling personnel reorder the advertisements in the show to achieve the contract objectives. The process of reordering the commercials is heretofore done manually and is extremely laborious. The sales personnel should not only ensure that there are no product conflicts but also make sure that the percentages of first, middle and last position commercials promised to each and every client are met. Though most up-front market contracts run through the entire broadcast year, it is not sufficient to have the percentages met on an aggregate basis for the entire contract. Most clients check whether their requirements are being met on a weekly basis. The broadcast week is assumed to start on a Monday in the industry. There are also several frequently occurring changes such as show format alterations and advertiser requests that necessitate revisions in the commercial schedule before a show actually airs. Most networks employ several people for scheduling commercials. Their jobs include the difficult requirement to come up with good schedules while under a constant pressure to meet the show broadcast deadlines.

Herein described are methods and apparatus to automate the commercial scheduling process while generating near optimal schedules to meet all or most of the above goals. The scheduling problem is formulated as a goal program. However, in some embodiments, the resulting integer-programming problem is too large to be solved in a reasonable amount of time using existing math program solvers such as CPLEX. Therefore herein described also are powerful heuristic algorithms that solve the problem in a fraction of the time.

First the problem is illustrated with an example before a formal description is described. When commercial slots are sold they occupy the positions in a show in the order in which they are sold. FIG. 1 lists the commercials that air in different breaks of a show as scheduled at the time of sale. This data is adapted from a two-hour long show called that recently aired on the NBC TV Network. The data has been altered to disguise the commercial slot purchasers and to better illustrate the problem at hand. Note from FIG. 1 that there are four commercial breaks on the show. The first two breaks are each 180 seconds long and the other two are 150 seconds long. There are eight clients advertising on the show, airing a total of 28 commercials. The column titled "Initial Schedule" along with the sub columns underneath it describes the order in which the commercials are placed in the show at the time of sale. Upon careful examination of the initial schedule the following product conflicts can be noted. Commercials 4 and 5 that promote the same product (product code, BAK) are both placed in commercial break 1. This leads to product conflict violation. Similarly commercials 19 and 20 are a product conflict violation, as are commercials 22 and 27.

FIG. 2 illustrates the units aired and percentages achieved in the three different positions for each of the clients advertising on this show. One unit corresponds to a 30-second commercial (a 15-second commercial is counted as 0.5 units). A column titled "Number of Units prior to current show" shows the units that have already aired for that client in the first, middle, and last positions. For example, for client 6 the network has already aired 5 units in the first position within a commercial break, 3 units in the middle positions of a commercial break, and 3 units in the last position of a commercial break, on shows that previously aired. This resulted in percentages achieved of 36%, 43%, and 21% in the first, middle and last positions respectively for that client. The assumption is made that the position percentage goals for all the clients are the same and are 33%, 34%, and 33% respectively. If the commercials were aired in the same sequence as they were sold, the percentages realized for various clients after the show is aired are shown in the column titled "Percentage units prior to rotation". Note the deviations of these percentages from their goals.

The commercials in the show have to be re-sequenced so as to eliminate the product conflicts and to ensure that the position percentage goals are more closely met. The column "Schedule after rotation" in FIG. 1 illustrates the new sequence of commercials after they are juggled (i.e., re-ordered within a break or to another break) to more closely meet the criteria. Note that all the products conflicts that are listed above have been eliminated. The new percentages realized for the clients upon airing the show are given in FIG. 2 in the column "percentages after rotation". The percentage goals are now more closely satisfied.

The juggling of commercials illustrated above was heretofore done manually. The process is extremely cumbersome. Herein described are methods and apparatus employing an algorithm that automatically juggles the commercials within a show to meet the product conflict and position goal requirements. In an exemplary embodiment, the herein described methods are computer implemented and, as used herein the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. Additionally, in one embodiment, a computer (not shown) employing the herein described methods includes a digital media device (not shown), for example, a floppy disk drive, CD-ROM drive, DVD drive, magnetic optical disk (MOD) device, or any other digital device including a network connecting device such as an Ethernet device for reading instructions and/or data from a computer-readable medium (not shown), such as a floppy disk, a CD-ROM, a DVD, a MOD or an other digital source such as a network or the Internet, as well as yet to be developed digital means encoded with a computer readable medium encoded with a computer program configured to instruct a computer to perform functions described herein. In another embodiment, the computer executes instructions stored in firmware (not shown).

The inputs to the algorithm are the position percentage requirements by a client and the initial schedule of commercials. Because of the discrete nature of the problem, it may be infeasible to generate a plan that meets all requirements exactly for all implementations. For example, it may not be feasible to allot exactly 33 percent of the commercials slots on a contract to the first position of a commercial break (also known as an A position) while meeting all other requirements. However, it is typically sufficient to meet these requirements within a certain range. For example, when a contract asks for 33% of commercials in an A position, the client accepts a percentage between 32% and 34%. Additionally, some clients are satisfied with a percentage between 30% and 36%, while other clients may want a percentage between 31% and 35%. The position percentages are specified by percent by year. Though most client contracts extend over periods of several months to a year, the percentage goal should be met on a weekly basis. For example, it is not acceptable for a client to air all its first position commercials, followed by all of its middle position commercials and then the last position commercials. The broadcast weeks starts on a Monday and the advertisers review the commercials that were aired for them every week to check whether their requirements are being met. Therefore the time period for the problem is set to be one week long in one embodiment.

The commercial juggling problem is formulated as a goal program wherein the product conflict and position percentage requirements are expressed as goal constraints. Additionally, although herein described with product conflict and position percentage as goals, other goals can be used. In other words, the herein described algorithms can be generalized for other constraints. Some constraints are 1. No Conflicting Products (Competitive or Antithetical) in Same Pod (Unless Only 15's are involved)—Must Check Both Product Codes & Applies to All ISCIs in Sectionals and Regionals. 2. No 15 Second Spots in Lead Position. 3. 15 Second Spots Should Not Get Last Position in Pod Unless Necessary. 4. Maximize Spread of Same Client's Spots Within Show. 5. Same Client Should Not Appear in Same Pod. 6. Maximize Spread of 15 Second Product Conflicts (Attempt to put 30 Seconds or More between Conflicting 15 Second Spots). And 7. Equitable Rotation Within Pods for Season (33% in A Position, 33% in Middle Positions, and 33% in Last Position)—Calculation: Do Not Count 15's, 30's equal 1 Position, 45's equal 1.5 Positions, 60's equal 2 Positions, etc. 8. Equitable Rotation Between Pods for Season (25% in First Pod, 50% in Middle Pods, and 25% Last Pod)—Calculation: 15's equal 0.5 Position, 30's equal 1 Position, 45's equal 1.5 Positions, 60's equal 2 Positions, etc. Sometimes it may not be feasible to meet all the goals. Therefore associated with the goals are slack variables. Penalty factors are associated with the slack variables. In an exemplary embodiment, the formulation is done assuming it is much more important to meet the product conflict requirements than to meet the position goals for clients. However, in other embodiments, that assumption was not implemented in the formulation. In the embodiment with that assumption, the penalty factor associated with the product conflict constraints was chosen to be of a value that is several orders of magnitude bigger than those associated with the position goals requirements. The penalty associated with meeting a product conflict requirement increases linearly with the slack variable associated with that constraint.

The position goals are met uniformly across all clients. If it is infeasible to meet all the client goals, the required deviations are spread evenly across clients. It is less desirable to meet the goals for a set of clients exactly while having a large deviation in meeting the goals of other clients. To achieve this, a nonlinear penalty cost associated with the deviations from goals for the position percentage constraints was utilized. These penalty factors are chosen such that they increase with the increase in deviation from goal. In order to maintain linearity of the model, a piecewise linear penalty function was chosen in one embodiment.

The algorithm is typically run overnight in a batch mode to schedule the commercials for the remainder of the week. For example, on Sunday night, the commercials for the entire following week are scheduled. During the day, the schedule for some of the shows may have to be adjusted to allow for any changes. The overnight algorithm readjusts the schedule for the week to account for any changes made during the day. In the next section, the notation and problem formulation is described in more detail.

The following notation formally introduces the problem.
General parameters:
t=time period, usually a week (t=0 and t=T−1 for the first and last periods in broadcast year respectively).
A=the set of advertisers.
$S_t$=the set of all shows in time period t.
$B_s$=the set of all breaks in show s.
$P_s$=the set of all product codes of commercials that air in show s.
$C_{a,t}^A$=the set of all commercials for advertiser an in time period t.
$C_{p,s}^P$=the set of all commercials of product code p to air on show s.
$C_{b,s}^B$=the set of all commercials scheduled to air in break b on show s.
$C_s = U_{p \in P_s} C_{p,s}^P$, the set of all commercials to air on show s.
$L_b$=the length of break b.
$l_c$=the length of commercial c.
$U_{a,t}$=the total length of all commercials for client a to air before time period t.

$$u_{at}^i = \sum_{c \in C_{at}^A} l_c,$$

the total length of all commercials for client a to air in position i before time period t.
i=position index of a commercial in a break; i equals 0 for the first position, 1 for any middle positions, and 2 for the last position in a commercial break.
$\alpha_{ai}$=fraction of commercials to be placed in position I for advertiser a (client goals)
Slack variables and associated Penalties:
$\sigma_{sbp}^P \geq 0$, slack variable associated with the product conflict constraint for show s, break b, and product p. This variable is equal to the number of commercials promoting product type p, in break b on show s less one.
$\pi^P$=linear penalty cost incurred in not meeting product conflict constraints. The penalty cost incurred is therefore $\sigma_{sbp}^P \pi^P$ for a given show, break and product combination.
A piece-wise linear function is used for the penalty cost incurred on deviations from position percentage goals for clients.
J=number of adjacent regions with linear penalty costs.

$\Lambda_j$=width of region j.

$\pi_j^G$=linear penalty cost incurrent in not meeting client goals in region j. The penalties are chosen such that $\pi_1^G < \pi_2^G < \ldots \pi_J^G$.

$\sigma_{aij1}^G$, $\sigma_{aij2}^G \geq 0$, slack variables associated with the fraction of commercials by position I for advertiser a in region j.

Decision variables:

$\chi_{cbi}$=1 if commercial c is placed in break b at position i, 0 otherwise.

The following notation is used in developing the heuristics section below.

$d_{ai} = \alpha_{ai} - u_{at}^i/U_{at}$, the deviation from goal for advertiser a in position i.

Mathematical Program Formulation, the goal programming formulation is as follows: Problem P1:

$$\text{Minimize} \sum_{s \in S_t} \sum_{b \in B_s} \sum_{p \in P_s} \sigma_{sbp}^P \pi^P + \sum_{s \in S_l} \sum_{b \in B_s} \sum_{j}^{J} (\sigma_{aij1}^G + \sigma_{aij2}^G)\pi_j^G \quad (1)$$

Subject to the following constraints:
Show Format constraints:

$$\sum_{c \in C_s} \sum_{i=0}^{2} 1_c \chi_{cbi} = L_b \quad \forall s \in S_t, \forall b \in B_s \quad (2)$$

$$\sum_{i=0}^{2} \sum_{b \in B_s} \chi_{cbi} = 1 \quad \forall s \in S_t, \forall c \in C_s \quad (3)$$

$$\sum_{c \in C_s} \chi_{cbi} = 1 \quad \forall s \in S_t, \forall b \in B_s, i = 0, 2 \quad (4)$$

Product conflict constraints:

$$\sum_{c \in C_{p,s}^P} \sum_{i=o}^{2} \chi_{cbi} - \sigma_{sbp}^P \leq 1 \quad \forall s \in S_t, \forall b \in B_s, \forall p \in P_s \quad (5)$$

Position percent constraints:

$$\sum_{b \in \cup_{s \in S_t} B_s} \sum_{c \in C_{at}^A} l_c x_{cbi} + u_{a,t-1}^i - \alpha_{aiI} U_{at} + \sum_{j=1}^{J} \sigma_{aij1}^G \sum_{j=1} \sigma_{aij2}^G = 0, \quad (6)$$

$$i = 0, 1, 2$$

$$\sigma_{aij2}^G \leq \Lambda_j, j=1,2,\ldots,J-1 \quad (7)$$

The objective function is the total penalty incurred in meeting all the requirements. The first term in the objective function is the penalty incurred in not meeting the product conflict constraints. The penalty factor $\pi^P$ was chosen to be several orders of magnitude large than the penalty factors $\pi^G$ to ensure that the product conflict constraints are given a higher priority over the position percent constraints.

The show format constraints are the hard constraints in the model. The constraints (2) ensure that the sum of the lengths of all the commercials assigned to a break on a show is equal to the length of the break. The constraints (3) ensure that a commercial can only be placed once, i.e. it can only be assigned to one position in one break. Constraints (4) ensure that only one commercial can be placed in the first (i=0) and last (i=2) positions of each break. Note that more than one commercial can be placed in the middle positions (i=1).

The product conflict constraints (5) and the position goal requirements constraints (6, 7) are the soft constraints in the model. The product-conflict constraints make sure that commercials for two competing products are not aired during the same commercial break. Constraints (5) ensure that the number of conflicting commercials that are placed in a break do not exceed one if possible. The slack variables $\sigma_{sbp}^P$ ensure feasibility of the problem if not all product conflict requirements can be met.

The constraints 6, 7 model the position goal requirements. These constraints model the criteria specified in the client request. Because of the discrete nature of the problem, it may be infeasible to generate a plan that meets all requirements exactly. Therefore, nonnegative slack variables are associated with each of these constraints. There are two sets of slack variables associated with each constraint. Some of the slack variables $\sigma_{aij1}^G$, j=1, . . . J take positive values when the schedule falls short of meeting the client requirements for position i. The magnitude of the deviation from the goal is spread over the set of variables. This enables charging a piece-wise linear penalty cost associated with the deviation. Similarly, some of the slack variables $\sigma_{aij2}^G$, j=1, . . . J take positive values when the schedule exceeds the client percentages for position i.

This goal-programming formulation results in an integer program that is too large to be solved in a reasonable amount of time using existing math program solvers such as CPLEX. Therefore also developed is a heuristic algorithm for solving the problem. The algorithm involves swapping commercials in an intelligent manner to meet both the product conflict and position goal requirements. The swapping algorithm explores the solution space while always meeting the hard constraints (show format requirements). Herein described is an exemplary heuristic algorithm in detail in the next section.

Heuristic Algorithm (HA) Section

The herein described heuristic algorithm takes advantage of the higher priority requirement of product conflict constraints over the position percentage constraints. The commercials are first juggled within a show to meet the product conflict requirements in the best possible manner. The commercials are then swapped in the show to meet the equitable rotation constraints while ensuring that the product conflicts resolution achieved does not become worse. In an exemplary embodiment, the heuristic therefore consists of two procedures, executed in the order presented below.

Product Conflict Resolution Sub-Section of HA Section

The product conflict resolution problem formulation can be obtained by dropping the position-percentage constraints (6, 7) and the second term in the objective function from problem P1. Note that the only constraints that link the decision variables associated with commercials on one show to those associated with commercials on other shows are the position percentage constraints. Once these constraints are dropped, the remaining problem decouples into independent and unrelated sub problems, one for each show. This is because the product conflict requirements should be satisfied on each show and commercials cannot be moved from one show to the other. They can only be juggled between the breaks in a show and within the positions in a break. The exact position of a commercial within a break is not relevant in meeting the product conflict requirements. A conflict is said to occur when two commercials promoting competing products air in the same break regardless of their position within the break. Therefore the decision variables for this problem can be represented by $x_{cb}$, where $x_{cb}=1$ if commercial c airs in break b and is zero otherwise. The product conflict resolution problem for a show s can therefore be expressed as follows. Problem P2:

$$\text{Minimize} \sum_{b \in B_s} \sum_{p \in P_s} \sigma_{sbp}^P \quad (9)$$

Subject to the following constraints:
Show Format constraints:

$$\sum_{c \in C_s} l_c x_{cb} = L_b \quad \forall b \in B_s \quad (10)$$

$$\sum_{b \in B_s} x_{cb} = 1 \quad \forall c \in C_s \quad (11)$$

$$\sum_{c \in C_s} x_{cb} = 1 \quad \forall b \in B_s \quad (12)$$

Product conflict constraints:

$$\sum_{c \in C_{p,s}^P} x_{cb} - \sigma_{sbp}^P \leq 1 \quad \forall b \in B_s, \forall p \in P_s \quad (13)$$

Note that the penalty factor $\pi^P$ can also be dropped from the objective function. The objective now is simply the total number of product conflicts.

The product conflict resolution problem over a time period can be solved by separately solving the problem P2 for each of the shows in the time period. This significantly reduces the size of the integer programming problems to be solved. Most problems can be solved using CPLEX 6.6 within a few seconds. However, for several shows it was noticed that even the smaller problem P2 required an unacceptable amount of run time to obtain the optimal solution using the math solver. In addition, it is also desirable to have a simple algorithm that does not depend on third party commercial code for its implementation. In practice, such an algorithm is easier to maintain by information technology personnel with no training in math programming. Commercial math programming codes can also be expensive especially on mainframe platforms. Therefore also herein described is a heuristic that is highly accurate and is guaranteed to solve in a very small amount of time.

First a lower bound on the objective function in P2 is developed. Let $\eta(Q)$ denote the cardinality of set Q, i.e. the number of elements in set Q and $q^+=q$ if $q \geq 0$, and 0 otherwise. Clearly for every product $p \in P_s$, there should to be at least $(\eta(C_{p,s}^P) - \eta(B_s))^+$ conflicts. This is because if the number of commercials of product p on show S, is less than or equal to the number of breaks, it may be possible to place at most one commercial for this product in each break. This results in no conflicts between product p commercials. On the other hand, if there are more commercials of product p than there are breaks, there are bound be at least as many conflicts as the difference between the number of commercials for this product and the number of commercial breaks. Therefore, $\sigma_{sbp}^P \geq (\eta(C_{p,s}^P) - \eta(B_s))^+$ which leads to the following lower bound on the objective function $$LB_s = \sum_{p \in P_s} (\eta(C_{p,s}^P) - \eta(B_s))^+.$$

The product conflict resolution algorithm involves swapping commercials to eliminate conflicts. A swap involves exchanging one or more commercials from one break with one or more commercials from another break. The sum of the lengths of the commercials that are being swapped from each break should be the same in order to ensure that the show format constraints are not violated. An n-m swap is defined as an exchange of n commercials from one break with m commercials from a different break on the show. For this swap to be allowable the sum of the lengths of the n commercials from the first break should be equal to the sum of the lengths of the m commercials from the other break.

For example, let $\tilde{C}_{b_1 s}^{nB}$ and $\tilde{C}_{b_2 s}^{mB}$ the subsets of m and n commercials that are scheduled to air in breaks $b_1$ and $b_2$ respectively $$(\tilde{C}_{b_1 s}^{nB} \subseteq C_{b_1 s}^B)$$

and $$(\tilde{C}_{b_2 s}^{mB} \subseteq C_{b_2 s}^B)$$

such that $$\sum_{c \in \tilde{C}_{b_1 s}^{nB}} = \sum_{c \in \tilde{C}_{b_2 s}^{mB}}.$$

The commercials in set $\tilde{C}_{b_1 s}^{nB}$ are swapped with those in set $\tilde{C}_{b_2 s}^{mB}$ without violating the show format constraints. This is an n-m swap (or m-n swap).

Conflict resolving swap: Let $c_1, c_2$ be two commercials that conflict which are scheduled in the same break in a show. Accordingly, an n-m swap is also called a conflict-resolving swap between $c_1$ and $c_2$, if the swap moves one of the two commercials out of the break and decreases the total number of product conflicts in the show. This is called a level-1, conflict-resolving swap since the conflict is resolved by just one swap.

In some cases there may not exist a level-1 conflict-resolving swap that resolves the conflict between two commercials. However, there still can exist two consecutive swaps at least one of them involving either $c_1$ or $c_2$, that will resolve the conflict between them and improve the over all objective function. Such swaps are called level-2, conflict-resolving swaps. For example in FIG. 3, there exists no level-1 swap that resolves the conflict between C1 and C2. But the conflict can be resolved as follows. In step 1, C1 and C7 are swapped resulting in a new product conflict between C4 and C7, however the total number of product conflicts in the show remain the same, thus the problem has not been made any worse. In step two, C7 and C9 are swapped which resolves the product conflict completely. In the algorithm first used are level-1 swaps to resolve conflicts between two commercials that promote the same product type and are placed in the same break. After trying to resolve all the existing conflicts using level-1 swaps, then level-2 swaps are used to resolve any other remaining product conflicts.

The algorithm examines each commercial in the show to see if it conflicts with any other commercial in its break. Let $c_1$ be the commercial under consideration. First start by setting $c_1$ to the first commercial in the show. If $c_1$ does not conflict with any commercial in its break, then move on to the next commercial. Otherwise, let $c_2$ be the commercial in the same break as $c_1$ and conflicts with $c_1$. Examine all possible level-1, conflict resolving swaps that swap either $c_1$ or $c_2$ out of its current commercial break and decrease the total number of conflicts in the show. If more than one such swaps exists, pick the one that results in the largest decrease in the objective function. This procedure is repeated for every commercial in the show in the sequential order.

After completing the above procedure, there may still be product conflicts left on the show. These conflicts cannot be resolved using level-1 swaps. so one can attempt to resolve them using level-2 swaps. Once again starting with the first commercial, examine the list to determine if it conflicts with any other commercial in its break. If it does and if it is not impossible to resolve the conflict i.e., $(\eta(C_{p,s}^P)-\eta(B_s))^+=0$, then search for a level-2 swap that improves the objective function. If such a swap exists than execute that swap. Then repeat this procedure for every commercial in the show in the sequential order. A summary of the algorithm is as follows.

Procedure Resolve Product Conflicts (Show)

```
Set n = 1 (n determines whether level-1 or level-2 swaps are used)
Do
   For each commercial location c₁ in the show
      If c₁ conflicts with any other commercial in the pod then
         Let c₂ be a commercial that conflicts with c1 and p be
         the product that they promote.
         If(n = 1) or (n =2 and (η(C_p^{p,s})-η(B_s))⁺ = 0) then
            Determine all possible level-n commercial swaps
               that move either c₁ or c₂ out of its break and decrease the
               objective function.
            If more than one such swap exist, execute the one
               which results in the largest decrease in objective
               function value.
         End if
      End if
      Set c₁ to the next commercial in show.
   End for
   Set n = n + 1
Loop while n <3
End Procedure
```

If there are still conflicts in the show, then one may use level-3 swaps to try and resolve them. However, in practice, it was found that level-2 swaps resolve all the conflicts most of the time as presented in the computational study section below.

Position Goals Achievement Sub-Section of HA Section

Once the product conflicts are resolved, the commercials can be further juggled to meet the position goals. In one embodiment, a greedy algorithm is utilized that improves the second term in the objective function in problem formulation P1 after each step. Note that the first term in the objective function measures the penalty achieved in meeting the product conflict requirements while the second term gives the penalty incurred in meeting the client position goal constraints. During this procedure, the first term in the objective function was ensured not to change.

In the procedure one executes a series of swaps to achieve the position goal requirements. The client position goals' deviation variables $d_{ai}$ are used in determining the swap to be executed at each step in the algorithm. A negative value for $d_{ai}$ indicates that the position goal was overachieved, whereas a positive value indicates the client needs more commercials in that position. Consider a situation where two clients $a_1$ and $a_2$ have their deviation values in positions i and j such that $d_{a_1 i}>0$, $d_{a_1 j}>0$, $d_{a_2 i}>0$, and $d_{a_2 j}>0$. If one swaps a commercial of client $a_1$ that is in position j with that of client $a_2$ that is in position i, all these four deviation values move closer to zero, thus improving the overall objective function. One can attempt to achieve the clients' goals through a series of such swaps. The algorithm stops when no swap that improves the objective function exists.

The algorithm begins by creating a sorted list of clients for each of the three commercial positions (I=0, 1, 2 corresponding to first, middle and last positions in a break respectively). Each of the three lists is sorted in the decreasing order of the deviation $d_{ai}$. Let $\overline{P}_i$ denote the sorted list for position i and $p_{ij}$ denote the client at position j in the list $\overline{P}_i$. The clients at the top of the sorted list $\overline{P}_i$ are in need of commercials in position i whereas those at the bottom of the list have excess commercials in that position.

To systematically consider clients that need commercials in certain positions and try to move their commercials into those positions to meet their corresponding goals, let $a_i$ be the client under consideration for movement into position i. Set $a_i = p_{i,0}$, $\forall i$ to start with ($p_{i,0}$ is the client at the top of the sorted list $\overline{P}_i$. Let $\overline{a}$ be the client with the largest deviation among $a_i$, i.e. $\overline{a}=a_{j_0}$ where $d_{a_{j_0} j_0} = \max(d_{a_1}, d_{a_2 2}, d_{a_3 3})$. Let $j_1, j_2$ denote the positions other than $j_0$, such that $d_{\overline{a} j_1} \geq d_{\overline{a} j_2}$. Clearly, $d_{\overline{a} j_0}>0$ (otherwise, all client goals are met and the algorithms stops). Since the client needs commercials in position $j_0$, it must have excess commercials in positions $j_1$ or $j_2$ or both. Let $0>d_{\overline{a} j_1}>d_{\overline{a} j_1}$, i.e., the client has excess commercials in both positions $j_1$ and $j_2$. However, position $j_2$ is more away from its goal than position $j_1$. If a commercial of client $\overline{a}$ is removed from position $j_2$ and then moved to position $j_0$, the overall objective function contribution due to $\overline{a}$ improves. However, to move a commercial of client $\overline{a}$ from position $j_2$ to position $j_0$, one has to move a commercial of another client from position $j_0$ to position $j_2$. The clients at the bottom of the list $\overline{P}_{j_0}$ have excess commercials in position $j_0$. An attempt is made to find such clients that have commercials in position $j_0$, which can be exchanged with a commercial of client $\overline{a}$ in position $j_2$ on the same show without increasing the number of product conflicts. If more than one suitable client exists, one picks the client $\tilde{a}$ for the swap for which the decrease in the objective function value is maximum. Once this swap is executed, the deviation values $d_{\overline{a} 0}, d_{\overline{a} 2}, d_{\tilde{a} 0}$ and $d_{\tilde{a} 2}$, change. Therefore, the client's lists, $\overline{P}_{j_0}$ and $\overline{P}_{j_2}$, are re-sorted to maintain them in sorted order. This is accomplished by moving client $\overline{a}$ down the list $\overline{P}_{j_0}$ and up the list $\overline{P}_{j_2}$ and client $\tilde{a}$ up the list $\overline{P}_{j_0}$ and down the list $\overline{P}_{j_2}$ to their proper positions. If no swap that improves the objective function is possible, one tries to swap a commercial of $\overline{a}$ that is in position $j_1$ into position $j_0$. If no such swap exists, setting $a_{j_0}$ to the next client in the list $\overline{P}_{j_0}$. The procedure described in this paragraph is then repeated until no further improving swaps exist for all clients with positive deviations, $d_{ai}$. A summary of the algorithm is as follows.

```
Procedure AchievePositionGoals ( )
Calculate the deviations from goals d_{ai}, for all clients.
For each position i (0,1, 2), create the sorted lists P̄_i by sorting
in the decreasing order of the deviations d_{ai}.
```

-continued

```
Do
    Set aᵢ = pᵢ,ₒ, ∀i a1 = p (a₁ is the
        client under consideration for improvement in position i).
    Set ā to be the client with the largest deviation among
        a₁, i.e. ā = a_{jₒ} where
        d_{aj₀} = max (d_{a₁1}, d_{a₂2}d_{a₃3}).
    Set j₁, j₂ to the positions other than j₀ such d_{aj₁} ≥ d_{aj₂}.
    Set Ω be the set of all swaps that move a
        commercial of client ā from position j₂ to position j₀.
    If Ω is an empty set then
        Set Ω be the set of all swaps that move a
            commercial of client ā from position j₂ to position j₀.
    End if
    If Ω is not empty then
        Execute the swap that results in the largest decrease
        in the objective
        function. Let ã be the other client involved in the swap.
        Re-calculate the deviations, d_{ãi} and d_{ãi}, ∀i.
            Re-sort the two lists p̄ᵢ for the positions involved in the swaps.
    Else
        Set a_{j₀} to the next client on the list p̄_{j₀}
    End if
    Loop until no further clients to be considered
End Procedure
```

Computational Study Section

The above algorithms were tested using the shows from the Early Morning (EM) day part on the NBC TV Network. This day part includes the shows that air between 7 am and 10 am on weekdays, between 7 am and 9 am on Saturdays, and between 8 am and 9 am on Sundays. The data included all the shows that aired between Sep. 17, 2001 and Dec. 30, 2001. This time period comprises the Fall quarter in the 2001-02 broadcast season. The data set therefore includes a total of 180 shows distributed evenly over 15 weeks. About 175 clients advertised on the Network on these shows. There were a total number of over 4500 commercials that were scheduled to air in about 900 commercial breaks averaging about 25 commercials and 5 breaks per show.

The product conflict resolution algorithm was first compared with the optimal solution obtained using the math solver. Both the algorithms were implemented on a computer operating under Windows 2000, with the following values selected for the problem parameters:

Time period, t=1 week
Product conflict penalty cost, $\pi^P$=1000
Number of regions for the piece-wise linear client goals penalty function, J=4
Region Widths, $\Lambda_1$=0.5, $\Lambda_2$=2, $\Lambda_4$=∞
Client goal penalty costs, $\pi_1^G$=0, $\pi_2^G$=0.5, $\pi_3^G$=1, $\pi_4^G$=2

The algorithm was implemented in Visual Basic. There were 662 product conflicts in the data set. The algorithm resolved 510 of them while the math solver resolved 516 conflicts. It was infeasible to resolve the remaining conflicts. The six additional conflicts that the math solver resolved were distributed over six shows. FIG. 4 illustrates a comparison of the runtimes of the heuristic versus the math solver. The heuristic was able to consistently solve all the problems within a run time of one second. The math solver however was not that consistent. Though it solved a majority of the problems within one second, it did not solve 11 problems to completion in one hour. Nineteen problems took more than 10 minutes to solve. FIG. 5 illustrates the performance of the entire heuristic (product conflict resolution followed by rotation for achieving client position goals) with that of solving problem P1 using CPLEX. The results obtained using the heuristic are presented in the column titled "Heuristic" and in the sub columns underneath it. The initial number of product conflicts and the penalty incurred in meeting the client position percentages are given in the column titled "Initial Schedule". The heuristic does an excellent job in improving the commercial schedule. The heuristic eliminated 99% of the product conflicts that can be resolved and improved the penalty incurred in meeting the client percentage goals by over 95%. On average it took the heuristic 12.27 seconds to solve a weekly problem. On the other hand, the math solver was unable to solve any of the 15 problems to optimality in over 10 hours. Therefore the heuristic is compared with the best solution obtained by the math solver after four hours of run time.

One noticed result was that the performance of the math solver was extremely poor when no initial solution was supplied to it. The performance improved when the initial placement of the commercials was specified by appropriately setting the initial values for the decision variables. The results listed in the column titled "CPLEX after 4 hours" are much worse than those obtained by the procedure.

To further ascertain the benefits of the heuristic, it was tested to determine if the math solver could improve the objective function value obtained using the heuristic. This was accomplished by supplying the output of the heuristic as the initial solution to the math solver. The results are illustrated in the column titled "CPLEX after 4 hours with heuristic initial solution". Note from the results that the improvements in the objective function values realized by CPLEX after four hours of run time are marginal.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of scheduling methods are described above in detail. The methods are not limited to the specific embodiments described herein, but rather, components of each method may be utilized independently and separately from other methods described herein.

While the invention has been described in terms of various specific embodiments, those skilled in the art will recognize that the invention can be practiced with modification within the spirit and scope of the claims.

What is claimed is:

1. A method for scheduling broadcast commercials prior to broadcast, the method comprising:
via a computer processing circuit:
receiving a listing of a plurality of commercials;
receiving scheduling criteria;
implementing a goal program for scheduling the plurality of commercials, wherein the goal program weights a first factor of the scheduling criteria greater than a second factor of the scheduling criteria; and
automatically generating a schedule for the plurality of commercials within a list of commercial slots based on at least the goal program and the scheduling criteria, wherein the schedule reduces a plurality of conflicts, and wherein automatically generating the schedule comprises heuristically re-ordering commercials within the list of commercial slots;
wherein the re-ordering comprises re-ordering the plurality of commercials such that a first subset of a client's commercials are in an initial position within a commercial break, a second subset of the client's commercials are in at least one middle position within a commercial break, and a third subset of the client's commercials are in a final position within a commercial break, such that an equitable rotation of the client's commercials from the plurality of commercials may be placed in the initial position, middle position, and the final position; and
wherein the client is a purchaser of at least one commercial slot in the list of commercial slots.

2. The method of claim 1, wherein the scheduling criteria includes at least one hard constraint that must always be satisfied, and at least one soft constraint that should be met if feasible, comprising a product-conflict constraint or a constraint defined by the client.

3. The method of claim 1, wherein automatically generating a schedule comprises searching a plurality of commercials within the list of commercial slots for level one swaps, wherein the level one swaps comprise a single commercial swap that resolves a scheduling conflict.

4. A method in accordance with claim 3 wherein the searching is performed sequentially through the list.

5. The method of claim 1, wherein the reordering comprises re-ordering the plurality of commercials such that no group of slots forming a single commercial break contains commercials for competing products.

6. The method of claim 1, wherein the plurality of conflicts includes at least one product conflict, the product conflict comprising two commercials promoting competing products.

7. The method of claim 1, wherein the goal program is configured to achieve a position percentage goal, the position percentage goal defining a spread of commercial placement in the initial position, middle position, and final position for the client, for other clients, or both.

8. The method of claim 1, wherein automatically generating a schedule comprises utilizing an integer program.

9. The method of claim 1, comprising formulating the goal program, wherein the goal program comprises slack variables indicating available slack in certain goals of the goal program and penalty factors associated with the slack variables indicating a priority of meeting the certain goals.

10. The method of claim 1, wherein the schedule comprises dates and times for broadcast of the commercials.

11. The method of claim 1, comprising satisfying equitable rotation of the plurality of commercials between the initial position, the middle position, and the final position between the client and other clients.

12. The method of claim 1, wherein the listing of the plurality of commercials comprises associated clients and product codes, and wherein the schedule for the plurality of commercials is based on at least the goal program, the scheduling criteria, and the associated clients and product codes.

13. The method of claim 1, wherein the schedule comprises time slots for linear television broadcast.

14. The method of claim 1, wherein the schedule comprises a live broadcast schedule for a television broadcast network.

15. A computer programmed to:
receive a selected list of a plurality of commercials;
receive scheduling criteria for scheduling the plurality of commercials;
generate, prior to displaying the plurality of commercials, a schedule based on a goal program and the scheduling criteria, wherein the goal program weights a first factor of the scheduling criteria greater than a second factor of the scheduling criteria, wherein the plurality of commercials are heuristically ordered, and wherein the schedule reduces a plurality of conflicts; and
re-order the plurality of commercials, prior to displaying the plurality of commercials, such that a first subset of a client's commercials are in an initial position within a commercial break, a second subset of the client's commercials are in at least one middle position within a commercial break, and a third subset of the client's commercials are in a final position within a commercial break, such that an equitable rotation of the client's commercials and other clients' commercials from the plurality of commercials may be placed in the initial position, middle position, and the final position; and
wherein the client and the other clients are purchasers of at least one commercial slot in the list of commercial slots.

16. The computer of claim 15, further programmed to searching a plurality of commercials within the list of commercial slots for level one swaps, wherein the level one swaps comprise a single commercial swap that resolves a scheduling conflict.

17. A non-transitory computer readable medium encoded with a program configured to instruct a computer to:
receive a selection of a plurality of commercials;
receive a plurality of scheduling criteria for scheduling the plurality of commercials;
generate a schedule of the plurality of commercials based on at least the plurality of scheduling criteria, a goal program, and an integer program, wherein the goal program weights a first factor of the scheduling criteria greater than a second factor of the scheduling criteria, and wherein the schedule reduces a plurality of conflicts; and
re-order the plurality of commercials such that a first subset of a client's commercials are in an initial position within a commercial break, a second subset of the client's commercials are in at least one middle position within a commercial break, and a third subset of the client's commercials are in a final position within a commercial break, such that an equitable rotation of the client's commercials and other clients' commercials from the plurality of commercials may be placed in the initial position, middle position, and the final position; and
wherein the client and the other clients are purchasers of at least one commercial slot in the list of commercial slots.

18. The computer readable medium of claim 17, wherein the program is configured to instruct the computer to heuristically re-order the plurality of commercials within the list of commercial slots.

19. The computer readable medium of claim 17, wherein the program is configured to instruct the computer to receive a plurality of scheduling criteria including at least one hard constraint that must always be satisfied, and at least one soft constraint that should be met if feasible, comprising a product-conflict constraint or a constraint defined by the client.

20. The computer readable medium of claim 17, wherein the program is configured to instruct the computer to search the schedule of the plurality of commercials within the list of commercial slots for level one swaps before searching the list for level two swaps, wherein the level one swaps comprise a single commercial swap that resolves a scheduling conflict and the level two swaps comprising two consecutive commercial swaps that resolves the scheduling conflict, wherein at least one of the two consecutive commercial swaps involves a commercial causing the scheduling conflict.

21. The computer readable medium of claim 20, wherein the program is configured to instruct the computer to search sequentially through the list for level one swaps before searching sequentially through the list for level two swaps.

22. The computer readable medium of claim 21, wherein the program further configured to instruct the computer to re-order the plurality of commercials such that:
no group of slots forming a commercial break contains commercials for competing products.

23. The computer readable medium of claim 17, wherein the plurality of conflicts includes at least one product conflict, the product conflict comprising two commercials promoting competing products.

24. The computer readable medium of claim 17, wherein the goal program is configured to achieve a position percentage goal.

* * * * *